Figure 1:
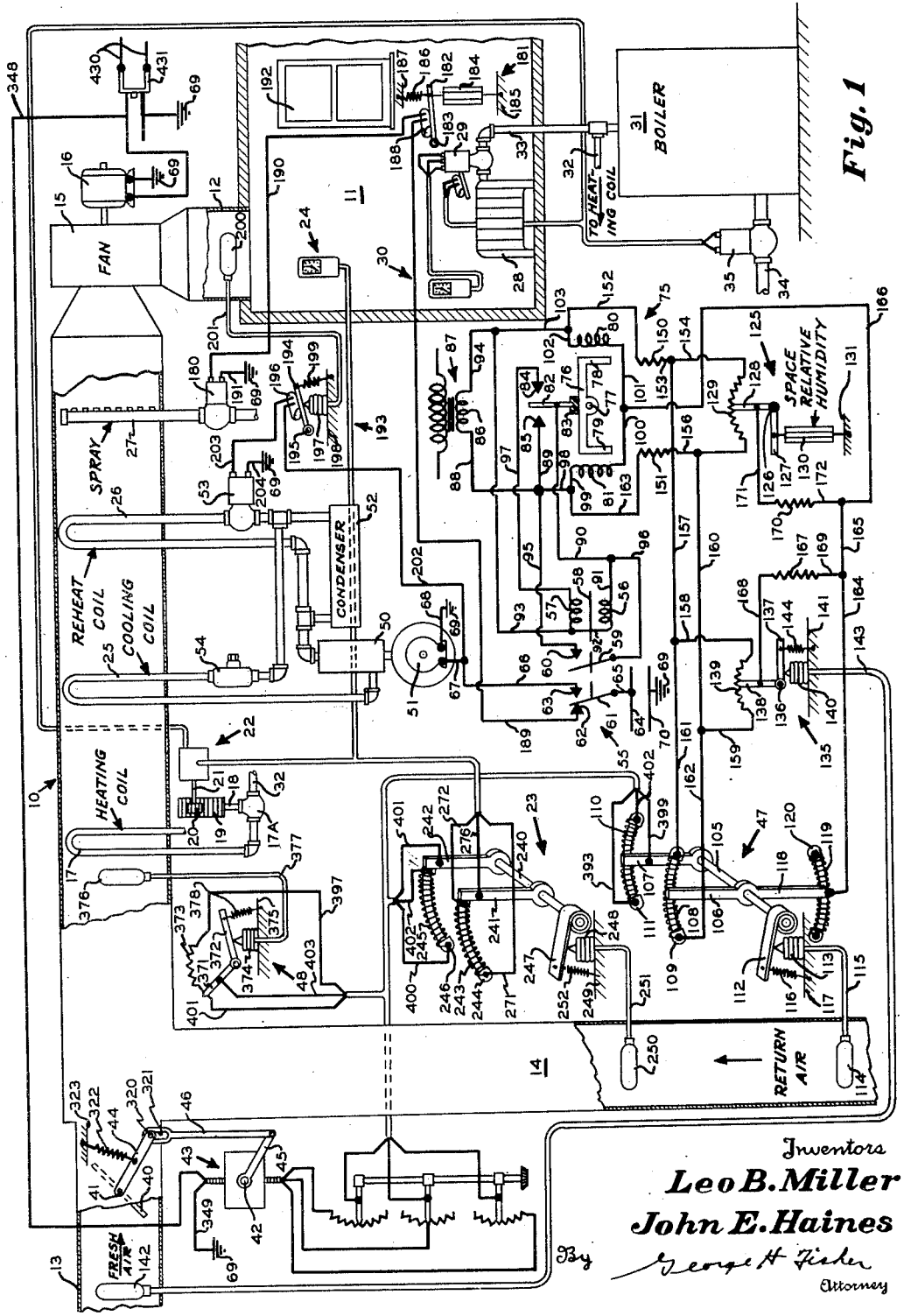

Oct. 24, 1939.   L. B. MILLER ET AL   2,177,496
AIR CONDITIONING SYSTEM
Filed Feb. 28, 1936   3 Sheets-Sheet 1

Inventors
Leo B. Miller
John E. Haines
By George H. Fisher
Attorney

Inventors
Leo B. Miller
John E. Haines

Patented Oct. 24, 1939

2,177,496

UNITED STATES PATENT OFFICE 2,177,496

AIR CONDITIONING SYSTEM

Leo B. Miller, Bronxville, N. Y., and John E. Haines, Minneapolis, Minn., assignors to Minneapolis-Honeywell Regulator Company, Minneapolis, Minn., a corporation of Delaware Application February 28, 1936, Serial No. 66,238

19 Claims. (Cl. 257—3)

The present invention relates to improvements in air conditioning systems by means of which the conditions within a building or space are controlled both during cold weather and hot weather. While the invention is primarily directed towards the maintaining of comfortable conditions within a space, such as a building adapted for human occupancy, many or all of the features of the invention are equally applicable to the controlling of conditions in a space or building utilized for industrial processes.

In the past it has generally been thought necessary to provide rather complicated apparatus, either automatically or manually operated, for the purpose of changing an air conditioning system from operating on a winter or cold weather cycle to a summer or warm weather cycle.

One of the underlying features and objects of the present invention is the provision of an air conditioning system for controlling the conditions in a space, both during cold weather and during warm weather, in which the various controls are so related, coordinated, interconnected and adjusted that they automatically condition the space in the proper manner irrespective of whether the outside temperature is cold or hot.

Hereinafter, for the purpose of illustration only, a specific type of air conditioning system will be described in detail. In this system, for example, damper means for controlling the supplying of outside or fresh air to the space being conditioned is operated in one manner during cold weather and in another manner during warm weather, the controllers being so interconnected and adjusted that the damper is automatically operated in the proper manner regardless of whether it be hot or cold outside and without the necessity of utilizing any manual or automatic change-over mechanism. Specifically, the damper in control of the flow of fresh air to the space being conditioned is moved from a position permitting the taking into such space of a maximum amount of fresh air to a position in which no fresh air or a minimum amount thereof is taken into such space as the temperature of the space or of the air leaving the space falls from one value to a second lower value, such, for instance, as from 78° F. to 68° F. On the other hand, during warm weather, this same damper is operated by a second thermostat so as to permit the taking into the space of a maximum amount of fresh air when the space temperature is at one value, say 74° F., and is then operated so that no fresh air or a minimum amount of fresh air is taken into the space when the temperature of the space or the air being withdrawn therefrom rises to 84° F., or some other temperature higher than the first-named temperature.

It, therefore, follows that a further object of the present invention is the provision of a control system for controlling the introduction of fresh air into a space in which the introduction of fresh air to such space is controlled by one condition responsive means, such as a thermostat, to produce one cycle of operations during cold weather and is controlled by a second condition responsive means, such as a second thermostat, so as to provide a different cycle of operations, the two condition responsive means being so adjusted and interconnected with each other and the damper operating means that these different cycles of operations are automatically obtained without the provision of any separate automatic or manual means for changing from one cycle to the other.

In the specific example to be described hereinafter in detail, the cooling apparatus is controlled primarily by a temperature responsive device through a relay mechanism. The arrangement is such that whenever cooling is not taking place the relay mechanism makes it possible for one of the cold weather conditioning devices to be operated by its controlling device. To go into more detail, the relay mechanism is controlled primarily by the temperature of the space or the temperature of the air withdrawn therefrom and the temperature value which will thus be maintained is either raised or lowered as the relative humidity of the space or return air rises and falls, or is raised and lowered as the outdoor temperature rises and falls, or both. Operation of the relay mechanism by these various controllers causes the cooling apparatus to be placed in operation. On the other hand, whenever the relay mechanism is not so operated a winter control device in the form of a relative humidity or moisture responsive device is enabled to operate one of the winter condition changing devices, such as a water spray.

A further object of the invention, therefore, is the provision of an air conditioning system in which summer conditioning devices are operated through the agency of a relay which is in turn controlled by suitable controls, the relay being so arranged as to permit winter air conditioning devices to be brought into operation under the control of suitable winter controls when summer conditioning is not taking place.

More specifically, it is an object of the present invention to provide a system in which cooling means is operated under the control of the temperature of the space or the temperature of air withdrawn therefrom, such temperature being modified by the moisture content of such air or by the outside temperature, or both, the control action being obtained by means of a relay mechanism which when not operated to produce a cooling action permits a winter relative humidity responsive device to place a water spray into operation.

Specifically, the control of the water spray is by a relative humidity responsive device, the control action of which is varied upon changes in outside temperature so that the value of relative humidity maintained in the space is such as to prevent condensation upon cold surfaces such as windows and walls. This variable control action is preferably obtained by placing the relative humidity responsive device in close proximity to some part of the building which is relatively directly affected by changes in outdoor temperature, such as near or below a window.

Other features of the invention include the provision of re-heating the air in the event the discharge temperature thereof is too low during the summer cooling cycle and obtaining the heat for this re-heating purpose by means of the heat generated in the cooling apparatus.

Another feature of the invention is the provision of means for variably heating during specified times, as by modulating or proportioning the flow of heating fluid to a heating device or heating coil, and reducing such flow to a minimum amount during other times, such as at night, and additionally providing apparatus to permit a definite flow of such heating medium whenever the temperature falls to some predetermined minimum during the night operation.

Other features of the invention include the provision of direct radiation control in connection with an air conditioning system so that the additional heating capacity of the direct radiation may be brought into operation in the event the air conditioning system itself is unable to maintain the desired temperature under severe weather conditions. Another of these features is the operating of a heat producing device whenever the flow of heating fluid is permitted to the air conditioning device or to the direct radiation. Another feature of the invention is the provision of an arrangement of electrical control for a fresh air damper, or other apparatus in an air conditioning system, by means of which the opening of a simple line switch places the fresh air damper in closed position although the fresh air damper is normally variably positioned during the normal operation of the system.

Other objects of the invention will be found in the drawings, the detailed description and the appended claims.

Figure 2:
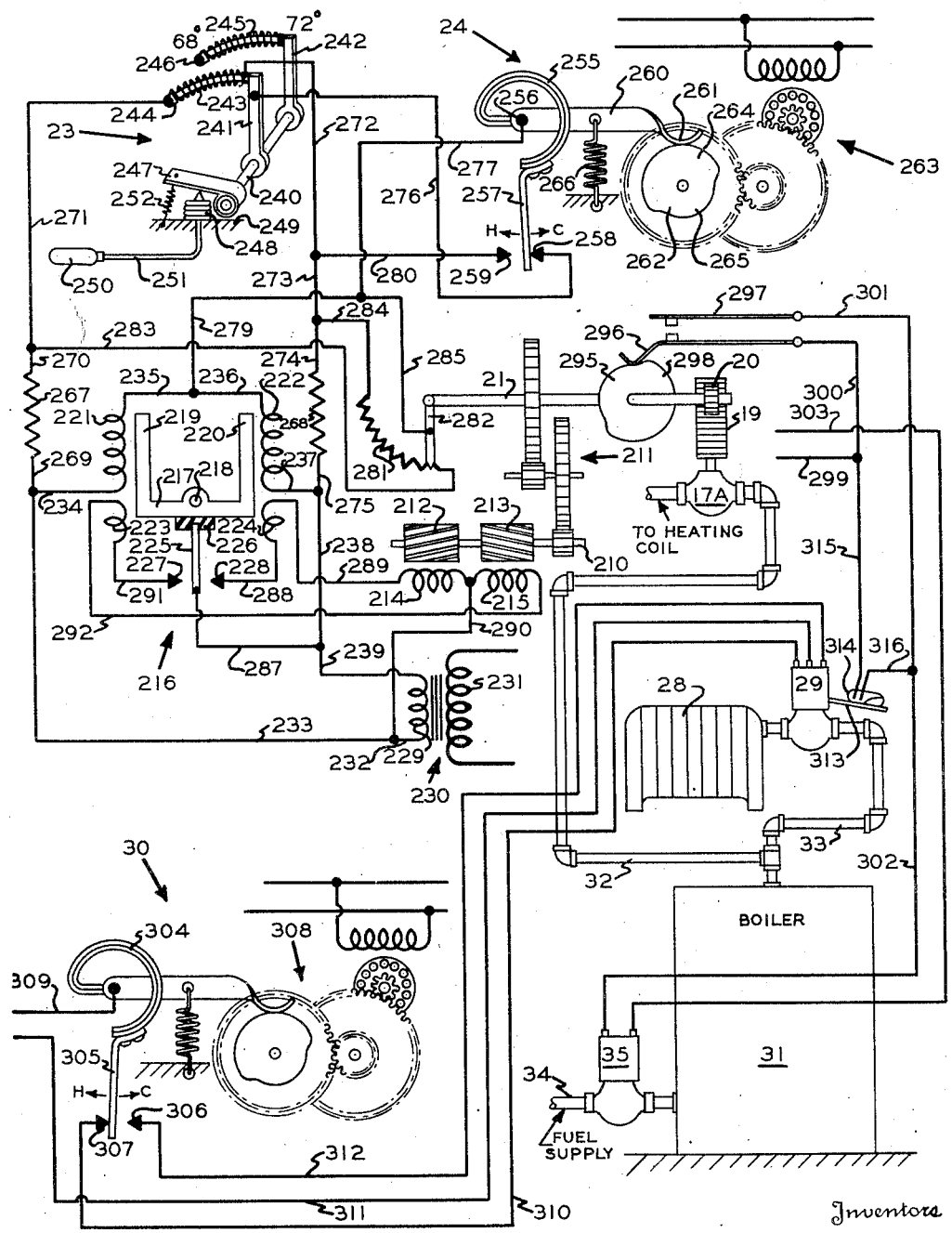
Figure 3:
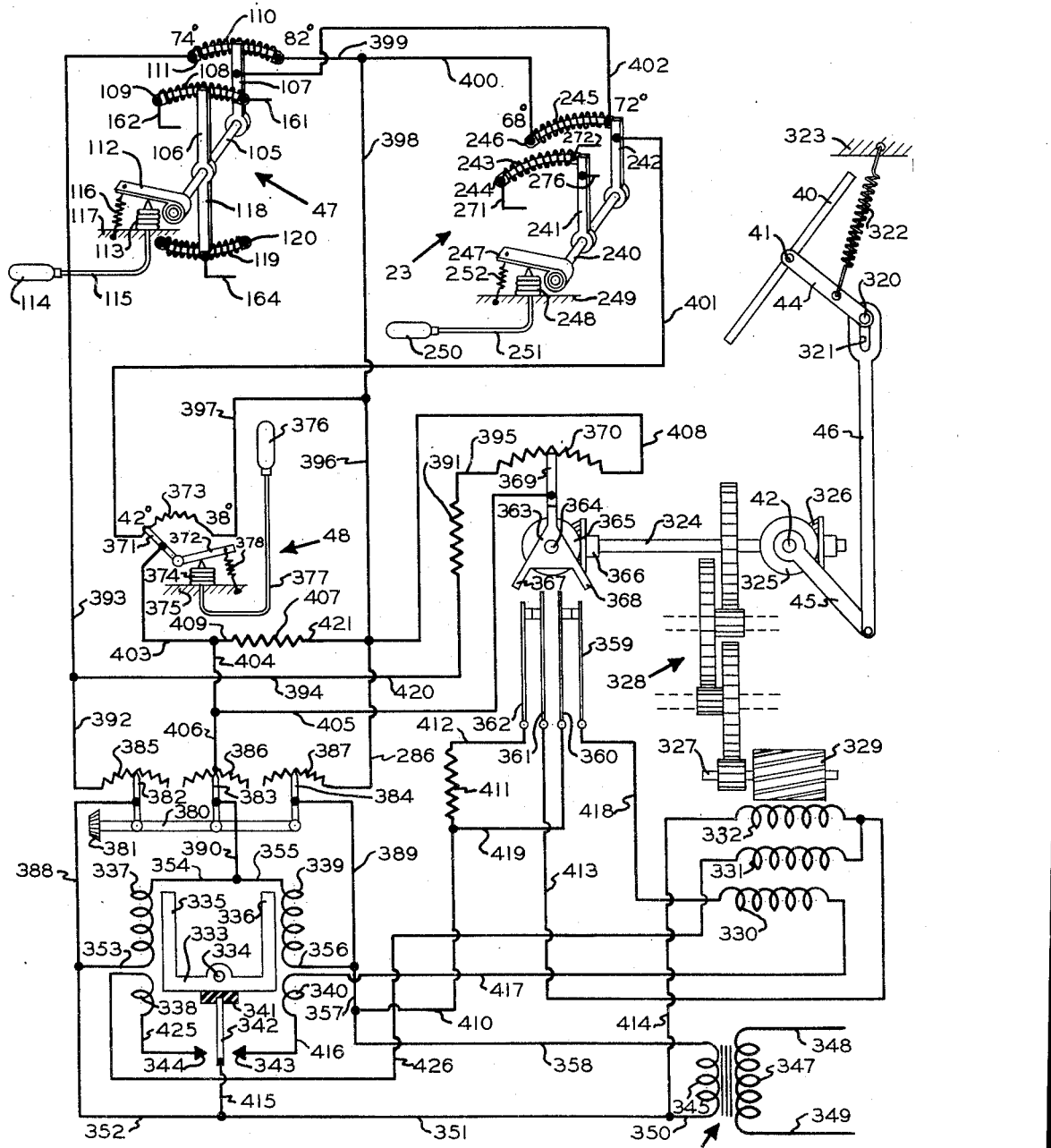

For a more complete understanding of the invention, reference may be had to the following detailed description of one illustrative embodiment of the invention and the accompanying drawings, in which:

Fig. 1 is a diagrammatic showing of a complete air conditioning system, the details of the summer cooling and winter humidifying control also being illustrated, Fig. 2 is a detailed diagrammatic showing of the winter heating control, both of the air conditioning apparatus and of the direct radiation, and Fig. 3 is a detailed diagrammatic showing of the fresh air damper control system.

Referring first to Fig. 1 of the drawings, an air conditioning device is indicated generally at 10. This air conditioning device 10 communicates with a space to be controlled, 11, by means of a discharge duct 12. Fresh air is introduced into the air conditioning chamber 10 by means of a fresh air inlet duct 13 and return air from the space 11 is also introduced thereto by means of a return air duct 14. A suitable fan 15 is utilized to cause a circulation of air through the fresh air and return air ducts 13 and 14, through the air conditioning chamber 10, through the discharge duct 12 and into the room 11. This fan 15 may be operated in any suitable manner and is herein shown as being driven by an electric motor 16.

Located within the air conditioning chamber 10 are a number of air conditioning devices which may take any of the usual forms. One of these devices is indicated at 17 as comprising a heating coil, the flow of fluid to which is controlled by a valve 17A. The valve 17A is provided with a valve stem 18 which is connected to a rack 19. Cooperating with the rack 19 is a pinion 20 which is operated by the main shaft 21 of a motorized mechanism 22. This motorized mechanism 22 may be controlled in any desired manner but is herein controlled in such a manner that the valve 17A is moved to a plurality of different positions so as to graduatingly vary the flow of heating medium to the heating coil 17. This motor mechanism 22 is controlled by a thermostatic controller generally indicated at 23 which may respond to any desired temperature and the details of which will be explained hereinafter. The motor mechanism 22 is additionally controlled, during certain periods such as at night or over week ends or holidays, by a time operated thermostatic mechanism 24 which responds to the temperature of the space 11.

The air conditioning chamber is additionally provided with a cooling coil 25, a re-heating coil 26 and a water spray 27, the detailed manner of operation and control of which will be explained hereinafter.

Located in the space to be controlled is direct radiation in the form of a radiator 28. The flow of heating fluid thereto is controlled by an electrically operated valve 29 which is in turn controlled by a space temperature responsive thermostatic mechanism generally indicated at 30. The heating fluid for the heating coil 17 and the direct radiation 28 may take any desired form and may be obtained in any desired manner. In this specific illustration of the invention, the heating fluid is steam which is produced by means of a boiler 31. The boiler 31 communicates with the valve 17 by means of a pipe 32 and communicates with the direct radiation 28 by means of a pipe 33. This boiler in turn may be heated in any suitable manner and is herein shown as heated by a gas burner (not shown) which is supplied with gas through a gas supply line 34, the flow of gas through which is controlled by an electrically operated valve 35.

In order to determine the proportions of fresh and return air delivered to the air conditioning chamber 10, the fresh air inlet duct 13 is provided with a damper 40 which is secured to a pivoted shaft 41. This shaft is connected to the main operating shaft 42 of a motorized mechanism 43 by means of crank arms 44 and 45 and a connecting link 46. This motor mechanism 43 is controlled in the summer by means of a thermostatic mechanism 47. It is also controlled in the winter by means of the thermostatic mechanism 23 and by a second thermostatic mechanism 48. While a single damper located in the fresh air inlet has been shown, it will be understood that a second, reversely operating damper could be located in the return air duct, as is usual in this art.

Now, going into the detailed manner of controlling the cooling coil 25, re-heating coil 26 and spray 27, the cooling coil may be supplied with a cooling medium in any of the well known and usual manners. In this particular embodiment of the invention, the cooling medium or system comprises a mechanically operated refrigeration system which includes a compressor 50 that is driven by an electrical motor 51. The compressor 50 compresses the returning gaseous refrigerant thereby raising its temperature, all as is well known in the art. This gaseous refrigerant may then all flow through a condenser 52, which is cooled in any of the usual manners, or may in part flow to the re-heating coil 26 under the control of an electrically operated valve 53. In either event, the temperature of the hot gaseous refrigerant is reduced so that the refrigerant is liquified after which it flows to the cooling coil 25 under the control of a plain expansion valve 54. The expansion valve 54 may be adjusted as desired, but is preferably set in such a manner that the temperature of the cooling coil 25 will be such as to give a large percentage of sensible cooling and a smaller percentage of dehumidification.

Energization of the compressor motor 51 is controlled by a relay mechanism indicated generally at 55. This relay mechanism 55 includes a first coil 56 which is an operating or energizing coil, and a second coil 57 which is a bucking or neutralizing coil. These coils cooperate in the control of an armature 58 which in turn positions switch arms 59 and 61. When the armature 58 is attracted, switch arm 59 moves into engagement with a contact 60, and switch arm 61 disengages a contact 62 and moves into engagement with a contact 63. Movement of switch arm 61 into engagement with contact 63 energizes compressor motor 51 as follows: Line wire 64, wire 65, switch arm 61, contact 63, wire 66, wire 67, compressor motor 51, and wire 68 to ground 69. The other line wire, which is denoted at 70, is also connected to ground 69.

The relay mechanism 55 is controlled by a balanced relay indicated generally at 75. This balanced relay 75 includes an armature 76, which is pivoted at 77, and is provided with legs 78 and 79. Cooperating with the leg 78 is a relay winding 80 and cooperating with the leg 79 is a similar relay winding 81. The armature 76 operates a switch arm 82 which is connected to the armature 76 through a block of insulating material 83. The switch arm 82 moves into engagement with a contact 84 when the relay winding 80 is energized sufficiently more highly than the relay winding 81, and is moved into engagement with a contact 85 when the relay winding 81 is energized sufficiently more highly than the relay winding 80.

Movement of switch arm 82 into engagement with contact 85 energizes the operating coil 56 of relay mechanism 55 as follows: From one side of the secondary 86 of a step-down transformer 87, wire 88, wire 89, contact 85, switch arm 82, wire 90, wire 91, operating coil 56, wire 92, wire 93, and wire 94 to the other side of secondary 86. This causes armature 58 to be attracted to move switch arm 59 into engagement with contact 60 and switch arm 61 into engagement with contact 63. Movement of switch arm 59 into engagement with contact 60 establishes a holding circuit for the operating coil 56 which is independent of the switch arm 82 and contact 85. This holding circuit is as follows: Secondary 86, wire 88, wire 95, contact 60, switch arm 59, wire 96, wire 91, operating coil 56, wire 92, wire 93, and wire 94 to the other side of secondary 86. The operating coil 56 will, therefore, remain energized, once having been energized, even though switch arm 82 separates from contact 85. Then whenever switch arm 82 moves into engagement with contact 84 the bucking coil 57 will be energized as follows: Secondary 86, wire 88, wire 95, contact 60, switch arm 59, wire 96, wire 90, switch arm 82, contact 84, wire 97, bucking coil 57, wire 93 and wire 94 to the other side of secondary 86. The magnetic flux produced by the bucking coil 57 neutralizes the magnetic flux produced by the operating coil 56. The armature 58 thereupon moves to the position shown in Fig. 1 under the influence of gravity so as to separate switch arm 59 from contact 60 and switch arm 61 from contact 63. Separation of switch arm 59 from contact 60 not only interrupts the energizing circuit for bucking coil 57 but also interrupts the holding circuit for operating coil 56. It will, therefore, be apparent that the relay mechanism 55 cannot again be operated until switch arm 82 again engages contact 85 and that continued engagement of switch arm 82 with contact 84, or re-engagement of these parts while the relay mechanism 55 is in the position shown, will be ineffective to influence this relay mechanism.

The two relay windings 80 and 81 of the balanced relay 75 are connected in series across the secondary 86 by a circuit as follows: Secondary 86, wire 88, wire 98, wire 99, relay winding 81, wire 100, wire 101, relay winding 80, wire 102, wire 103, and wire 94 to the other side of secondary 86. By reason of this arrangement it will be evident that the relay windings 80 and 81 are normally equally energized wherefor the switch arm 82 is normally disposed intermediate contacts 84 and 85.

The relative energizations of relay windings 80 and 81 are primarily varied in accordance with the temperature of the space 11, or of the air being withdrawn therefrom. The thermostatic mechanism 47 hereinbefore referred to, comprises a rotary shaft 105 that is provided with a pair of control arms 106 and 107. Control arm 106 cooperates with a coiled resistance 108 which is wound upon a suitable support 109. Similarly, the control arm 107 cooperates with a coiled resistance 110 which is wound about a suitable support 111. The operating shaft 105 carries an operating arm 112 which is positioned by a bellows 113. This bellows is connected to a controlling bulb 114 through a connecting tube 115. The bellows 113, tube 115 and controlling bulb 114 are charged with a suitable volatile fluid, as is well known in the art, wherefor variable pressures are created in the bellows 113 upon variations in the temperature of the medium to which the controlling bulb 114 is subjected. These variable pressures are opposed by a coiled spring 116 which has one of its ends secured to the operating arm 112 and its other end secured to a support 117. The support 117 also operates to support one end of bellows 113. As indicated above, this thermostatic mechanism 47 may respond to the temperature of the space 11 or the temperature of the air withdrawn therefrom. In this instant illustration, the controlling bulb 114 is shown as disposed within the return duct 14 wherefor the thermostatic mechanism 47 responds to the temperature of the air withdrawn from the space 11. The thermostatic mechanism 47 is further provided with a corrector arm 118 that is likewise operated by the operating shaft 105. This corrector arm 118 cooperates with a corrector resistance 119 which is wound upon a suitable support 120. The range of this thermostatic mechanism 47 will, of course, depend upon the particular conditions which it is desired to maintain within the space 11, and in this particular instance the control arms 106 and 107 engage the extreme left-hand ends of their associated resistances 108 and 110 when the return air temperature is 74° F. As this temperature rises, these control arms move along the control resistances towards their right-hand ends and finally reach the extreme right-hand ends of these control resistances when the return air temperature has risen to 82° F. The corrector arm 118 moves from the extreme right-hand end of corrector resistance 119 to the extreme left-hand end thereof when the return air temperature rises from 74° F. to 82° F. With the parts in the position shown, the control arms 106 and 107 and the corrector arm 118 are all engaging the center of their respective resistances 108, 110 and 119 wherefor it is evident that the return air temperature is substantially 78° F.

The relative energizations of the relay windings 80 and 81 are further modified by a space relative himidity responsive device indicated generally at 125. This device includes a bell crank pivoted at 126 which is provided with a leftwardly extending operating arm 127 and a control arm 128. The control arm 128 cooperates with a control resistance 129. The actuating arm 127 is positioned by a relative humidity responsive element 130 which has one of its ends connected to the actuating arm 127 and its other end connected to a suitable support 131. The range of this device 125 is such that control arm 128 engages the left-hand end of control resistance 129 when the relative humidity is 30 per cent or therebelow and gradually traverses the control resistance 129 upon rise in relative humidity and finally reaches the extreme right-hand end thereof when the relative humidity has reached 60 per cent.

The relative energizations of relay windings 80 and 81 are further modified by an outdoor temperature responsive thermostat generally indicated at 135. This thermostat includes a bell crank pivoted at 136 which includes an actuating arm 137 and a control arm 138. The control arm 138 cooperates with a control resistance 139. The actuating arm 137 is positioned by a bellows 140 which has one of its ends secured to a suitable support 141, its other end bearing against the actuating arm 137. This bellows 140 is connected to a controlling bulb 142 by means of an interconnecting tube 143. The bellows, bulb and tube are charged with a suitable volatile fluid which develops variable pressures in the bellows 140 upon variations in the temperature of the medium in which the controlling bulb 142 is disposed. The variable pressures thus created in bellows 140 are opposed by a coiled spring 144 which has one of its ends secured to the actuating arm 137 and its other end secured to a suitable support 141. As noted above, this thermostat 135 responds to outdoor temperature and for this purpose the controlling bulb 142 may be conveniently located in the fresh air inlet duct 13. The range of this instrument is such that control arm 138 engages the extreme right-hand end of control resistance 139 when the outdoor temperature is 75° F. As the outdoor temperature rises, the control arm 138 gradually moves along control resistance 139 towards its left-hand end and finally engages the extreme left-hand end thereof when the outdoor temperature has risen to 100° F.

The control resistance 108 of the thermostatic mechanism 47, the control resistance 139 of thermostat 135 and the control resistance 129 of the humidity responsive device 125 are all connected in parallel with each other and are connected in parallel with the series connected relay windings 80 and 81, through a pair of protective resistances 150 and 151. These circuits are as follows: From the upper end of relay winding 80, wire 102, wire 152, protective resistance 150, and wire 153, at which point the circuit branches; one part goes by way of wire 154, control resistance 129 and wire 155 to a wire 156; another portion goes by way of wire 157, wire 158, control resistance 139, wire 159 and wire 160 to wire 156; whereas a third portion goes by way of wire 157, wire 161, control resistance 108, wire 162 and wire 160 to wire 156; at this point the circuits all join and go by way of protective resistance 151, wire 163 and wire 99 to the upper end of relay winding 81. The center of corrector resistance 119 is connected to the junction of wires 100 and 101, and therefore is connected intermediate the relay windings 80 and 81 by wires 164, 165 and 166. The control arm 138 is connected to the junction of wires 164 and 165, through a resistance 167, by means of wires 168 and 169 and the control arm 128 is connected to the junction of wires 165 and 166, through a similar resistance 170, by means of wires 171 and 172.

With the parts in the position shown, the return air temperature is substantially 78° so that control arm 106 is engaging the center of control resistance 108 and the corrector arm 118 is engaging the center of corrector resistance 119. Also, the outdoor temperature is substantially 87½° F. so that control arm 138 is engaging the center of control resistance 139 and the relative humidity of the space is substantially 45 per cent so that control arm 128 is engaging substantially the center of control resistance 129. Under these conditions, it will be evident that the relay windings 80 and 81 are equally energized. Switch arm 82 is, therefore, intermediate contacts 84 and 85 and is not engaging either of them. If the return air temperature should rise, control arm 106 will move along control resistance 108 towards its right-hand end. This reduces the amount of resistance in parallel with the relay winding 80, such parallel circuit being as follows: From the upper end of relay winding 80, wire 102, wire 152, protective resistance 150, wire 153, wire 157, wire 161, less than half of control resistance 108, control arm 106, a small portion of corrector resistance 119, wire 164, wire 165, wire 166, and wire 101 to the lower end of relay winding 80. While a number of other changes take place in the various series parallel resistance arrangement set forth above, from the example just given it will be seen that less current will now flow through the relay winding 80 and more will flow through the parallel circuit just traced. As a result, relay winding 81 becomes more highly energized than relay winding 80, wherefor switch arm 82 engages contact 85. Operating coil 56 of relay 55 is thereupon energized and armature 58 is attracted and switch arm 59 engages contact 60 to establish the hereinbefore-mentioned holding circuit; also, switch arm 61 engages contact 63 to energize compressor motor 51, all as set forth above. Liquid refrigerant is therefore supplied to the cooling coil 25 and this coil lowers the temperature of the air passing through the air conditioning chamber 10 and being delivered to the space 11. This should lower the temperature of the air being withdrawn from the space 11 so that control arm 106 will move towards the left along control resistance 108.

Initial leftward movement of control arm 106 causes switch arm 82 to separate from contact 85 but the armature 58 remains in its new position, by reason of the holding circuit, so that the compressor motor 51 remains energized. Further movement of control arm 106 to the left reduces the amount of control resistance 108 in parallel with the relay winding 81 and when this leftward movement is sufficient the relay winding 80 will be energized sufficiently more highly than relay winding 81 to cause switch arm 82 to engage contact 84. Armature 58 then returns to the position shown in Fig. 1 wherein compressor motor 51 is deenergized. In this manner, a rise or fall in the return air temperature causes energization or deenergization of the compressor motor 51.

If the relative humidity should increase, control arm 128 will move along control resistance 129 towards its right-hand end. This movement will decrease the amount of control resistance 129 which is connected in parallel with the relay winding 80, just as would an increase in the return air temperature. Therefore, even though the return air temperature is such as not to demand a cooling action, an increase in the relative humidity of a sufficient amount will cause the switch arm 82 to engage contact 85 so as to result in operation of compressor motor 51. As explained above, the action of cooling coil 25 is preferably such that the greater portion of the cooling action is used to remove sensible heat. This operation of the compressor, therefore, reduces the room temperature somewhat to compensate for the increased relative humidity whereby to maintain the effective temperature substantially constant. Opposite movement of the control arm 128 as a result of a drop in relative humidity, of course, brings about the opposite action. It will be seen then that the general effect of the operation of the humidity controller 125 might be said to vary the control point of the main thermostatic controller 47 in such a manner that the control point thereof is raised upon a lowering in relative humidity and is lowered upon a rise in relative humidity.

If the outside temperature should drop so that control arm 138 moves along control resistance 139 towards its right-hand end, then part of control resistance 139 is removed from its parallel relationship with the relay winding 80, so that the compressor motor will be operated even though the temperature of the return air has not risen. On the other hand, if the outdoor temperature rises, then the return air temperature must likewise rise more than usual in order to obtain operation of the compressor motor 51. In this manner, the outdoor temperature responsive thermostat 135 varies the control point of the return air thermostat in such a manner that higher and higher return air temperatures are maintained as the outdoor temperature rises. Since the outdoor controller has a range of 75° F. to 100° F. and the return air temperature controller has only a range of 74° F. to 82° F., it will be apparent that the return air temperature is not permitted to rise as fast as the outdoor temperature rises. It, therefore, is apparent that a varying differential, which increases upon increase in outdoor temperature, is maintained between the indoor temperature and the outdoor temperatures The function of the resistances 167 and 170 is to prevent either the outdoor temperature controller 135 or the relative humidity controller 125 from taking absolute command of the balanced relay mechanism 75, in the event either of these controllers goes to either of its extreme positions. As is probably now apparent, only a portion of the total range of movement of the return air controller 47 is required to operate the balanced relay mechanism 75, and the particular portion or operating range of this controller 47 is determined by the positions of the outdoor controller 135 and the humidity responsive controller 125. The function of the corrector resistance 119, more and more of which is inserted in the circuit as the return air temperature either rises above or falls below a median value of 78° F., is to maintain this operating differential constant regardless of which portion of the total range of controller 47 is doing the controlling at any particular time.

For a better understanding of the detailed operation of compensated systems of this type, reference may be had to the copending application of John E. Haines, Serial No. 38,946, filed September 3, 1935.

In connection with the discussion of the relay mechanism 55, it was pointed out that switch arm 61 engages contact 62 when the parts are in the position shown. In other words, this switch arm 61 engages contact 62 whenever the cooling apparatus is not being operated. For the purpose of controlling the relative humidity during such periods when cooling is not being utilized, the water spray 27 is supplied with water under the control of an electrically operated valve 180. This valve 180 is controlled by a relative humidity responsive device generally indicated at 181 which responds to the relative humidity of the space 11. This device 181 includes a switch carrying arm 182 which is pivoted at 183. One end of a relative humidity responsive element 184 is connected to this arm 182 and its other end is connected to a suitable support 185. A coiled spring 186 serves to keep the relative humidity responsive element 184 under proper tension and has one of its ends secured to the switch carrying arm 182 and its other end secured to a suitable support 187. The switch carrying arm 182 carries a mercury switch 188. The setting of this relative humidity responsive device 181 is such that mercury switch 188 is in open circuit position whenever the relative humidity of the space 11 is above 30 per cent. If the relative humidity of the space 11 falls to 30 per cent or therebelow, the mercury switch 188 is moved to closed position. Inasmuch as the relative humidity of the space is now 45 per cent, with the parts in the position shown, the mercury switch 188 is open.

Assuming, however, it becomes cold outside, then, as is well known, the relative humidity generally decreases. If the relative humidity of the space 11 is thus caused to decrease to 30 per cent, the mercury switch 188 moves to closed circuit position whereupon the spray valve 180 is energized as follows: Line wire 64, wire 65, switch arm 61, contact 62, wire 189, mercury switch 188, wire 190, spray valve 180, wire 191, and ground 69. Water is thereupon sprayed into the path of the air passing through the air conditioning chamber 10 and this serves to raise the relative humidity of such air and the relative humidity in the space 11. When the relative humidity of the space again rises above 30 per cent the mercury switch 188 opens and deenergizes the spray valve 180.

While it would probably never happen that the outside temperature were such as to require cooling and at the same time have the space relative humidity below 30 per cent, even if such condition did exist it would be impossible to open the spray valve 180 while cooling was taking place since under such conditions the circuit to valve 180 would be broken since switch arm 61 would be disengaging contact 62.

It is now known and appreciated that if too high a relative humidity is maintained in a space during cold weather, the temperature of exposed walls, windows and other surfaces may fall below the dew point of the air in the space thereby causing condensation. The present invention, therefore, contemplates lowering the standard of relative humidity maintained in the space 11 upon lowering in the outdoor temperature. This is simply accomplished in the present system by placing the relative humidity controller 181 in close proximity to a window or other exposed surface 192 of the room or space 11. The temperature of the air near such exposed surface on the inside of the space is, of course, lowered when it becomes cold outside. The relative humidity of this air, therefore, rises although the general relative humidity throughout the room or space 11 may remain substantially constant. The relative humidity controller 181 is exposed to this small portion of air, the relative humidity of which is raised as a result of lowering in the outdoor temperature. As a result, when it becomes cold outdoors the relative humidity of the air near the window 192 will be above 30 per cent even though the relative humidity throughout the space 11 itself is considerably therebelow. Since the relative humidity controller 181 is responding to this air near the window 192, and although it always operates at 30 per cent, it in effect will not permit the supplying of water to the air passing through the air conditioning chamber 10 when it is cold outside even though the relative humidity of the space 11 in general is lower than 30 per cent. For best results, it is thought that the controller should be located below the window 192 although it will be understood that other locations might be suitable and other exposed portions than a window might also bring about the desired result.

As indicated above, provision is made for reheating the air passing through the air conditioning chamber 10 during the cooling operation if such reheating is necessary. It may happen that the cooling of this air passing through the air conditioning chamber 10 may lower the temperature thereof to such a degree that its discharge into the room or space 11 will cause undesirable drafts even though the temperature of the space and its relation to the space relative humidity and outside temperature is such that a cooling action is required. In order to obviate this possibility, the valve 53, which is in control of the reheating coil 26, is controlled by a thermostat generally indicated at 193. This thermostat includes a switch carrying arm 194 pivoted at 195, which supports a mercury switch 196. This switch carrying arm 194 is positioned by one end of a bellows 197, the other end of which is supported by a suitable support 198. The bellows is controlled by a controlling bulb 200 to which it is connected by a communicating tube 201. The bellows, bulb and tube are charged with a suitable volatile fluid so that variable pressures are created in the bellows 197 in response to changes in the temperature to which the controlling bulb 200 is subjected. These variable pressures are opposed by a coiled spring 199 which has one of its ends secured to the switch carrying arm 194 and its other end secured to the support 198. The controlling bulb 200, in this embodiment of the invention, responds to the temperature of the air being discharged into the room 11 and is herein shown as conveniently located in the discharge duct 12. The arrangement is such that mercury switch 196 is in open circuit position whenever the temperature of the discharged air is above some value, such as 60° F., and is closed whenever the temperature of the discharged air falls to 60° F. or therebelow.

The energization of the valve 53 is not only controlled by mercury switch 196 but is also controlled by the switch arm 61 and contact 63 of the relay mechanism 55. Whenever switch arm 61 engages contact 63 so as to energize the compressor motor 51 in the manner explained above, a circuit for the valve 53 is placed in condition to be completed upon closure of the mercury switch 196. This energizing circuit for the valve 53 is as follows: Line wire 64, wire 65, switch arm 61, contact 63, wire 66, wire 202, mercury switch 196, wire 203, valve 53 and wire 204 to ground 69. It will, therefore, be evident that whenever the compressor motor 51 is energized so as to supply refrigerant to the cooling coil 25, if the discharge air temperature falls to 60° F. or therebelow, the valve 53 will be energized to permit a portion of the hot gaseous refrigerant to pass through the reheating coil 26 so as to raise the temperature of the air being discharged into the room or space 11. It will be obvious that other sources of heat for this reheating function could be utilized instead of the hot gaseous refrigerant.

Turning now to Fig. 2, the control of the heating coil 17 and of the direct radiation 28 will be explained in detail. As pointed out above, the valve 17A which controls the flow of heating fluid to the heating coil 17 is controlled by the main operating shaft 21 of a motorized mechanism 22. This motorized mechanism is diagrammatically shown in Fig. 2 of the drawings and includes a rotor shaft 210 which is coupled to the main operating shaft 21 through suitable reduction gearing generally indicated at 211. This rotor shaft 210 has secured thereto a pair of motor rotors 212 and 213 with which field windings 214 and 215 are respectively associated. Upon energization of field winding 214 the rotor 212 rotates rotor shaft 210 in one direction and upon energization of the other field winding 215 the rotor 213 rotates the rotor shaft 210 in the opposite direction. It will thus be seen that the two motor rotors and field windings constitute a reversible motor and it is to be understood that any other type of reversible motor means could be utilized in its place.

Energization of the field windings 214 and 215 is controlled by a relay mechanism generally indicated at 216. This relay mechanism includes an armature 217 which is pivoted at 218 and includes legs 219 and 220. Main relay windings 221 and 222 respectively cooperate with the legs 219 and 220 of armature 217. In addition, auxiliary relay windings 223 and 224 likewise respectively cooperate with the legs 219 and 220 of the armature 217. A switch arm 225 is secured to armature 217 through the medium of a piece of insulating material 226 and is disposed between a pair of contacts 227 and 228. If armature 217 is rotated clockwise, switch arm 225 engages contact 227 and if the armature 217 is rotated counter-clockwise the switch arm 225 engages contact 228.

The main relay windings 221 and 222 are connected in series across the secondary 229 of a step-down transformer 230 having a high voltage primary 231 which is connected to a suitable source of electrical energy. This series circuit is as follows: Secondary 229, wire 232, wire 233, wire 234, main relay winding 221, wire 235, wire 236, main relay winding 222, wire 237, wire 238 and wire 239 to the other side of secondary 229. In the absence of any other circuit connections it will be apparent that these main relay windings 221 and 222 would be equally energized wherefor armature 217 would be maintained in the intermediate position shown wherein switch arm 225 is disposed between contacts 227 and 228 and does not engage either of them.

The relative energizations of the two main relay windings 221 and 222 are primarily controlled by the thermostatic mechanism 23 referred to hereinabove. This thermostatic mechanism 23 includes an operating shaft 240 which rotates a pair of control arms 241 and 242. The control arm 241 cooperates with a control resistance 243 which is wound about a suitable support 244. Similarly, the control arm 242 cooperates with a control resistance 245 which is wound about a suitable support 246. Also secured to the shaft 240 is an actuating arm 247 which is positioned by one end of a bellows 248, the other end of which is secured to a suitable support 249. This bellows is connected to a controlling bulb 250 through a connecting tube 251. The bellows, bulb and connecting tube are charged with a suitable volatile fluid so that variable pressures are created in the bellows 248 upon changes in the temperature of the medium to which the controlling bulb 250 responds. These variable pressures are opposed by a coiled spring 252 which has one of its ends connected to the actuating arm 247 and its other end connected to the support 249. In the present embodiment of the invention, this thermostatic mechanism 23 responds to the temperature of the room or space 11 or to the temperature of the air withdrawn therefrom and the controlling bulb 250 is shown as conveniently located in the return air duct 14 (see Fig. 1). The range of this instrument may be selected as desired but is herein indicated as being from 68° F. to 72° F. so that the control arms 241 and 242 move from the extreme right-hand ends of the control resistances 243 and 245 to the extreme left-hand ends thereof as the temperature of the return air drops from 72° F. to 68° F.

The manner in which the thermostatic mechanism 23 controls the relative energizations of main relay windings 221 and 222 is modified by the time operated thermostatic mechanism 24 which has also been referred to above. This thermostatic mechanism 24 includes a bimetallic element 255, which has one of its ends secured to a suitable post 256. The other end of bimetallic element 255 carries a contact arm 257 which is adapted to alternately engage cold and hot contacts 258 and 259. The post 256 is carried by a lever 260, the right-hand end of which is formed in a manner so as to constitute a cam follower 261. This cam follower 261 cooperates with a cam 262 which is caused to rotate once in every 24 hours by means of any suitable mechanism, such as the electric motor and reduction gearing generally indicated at 263. The cam 262 is provided with a raised portion 264, which is the day part of the cam, and with a lower portion 265, which is the night part of the cam. The lever 260 is biased so that the cam follower portion 261 thereof always engages the periphery of cam 262, by means of a spring 266.

When the cam follower 261 is engaging the raised portion 264 of the cam 262, the setting of the thermostat is made higher than the temperature of the room or space will ever rise so that this thermostat, in effect, continuously calls for heat whenever it is on day operation. In other words, during the day the contact arm 257 continuously engages contact 258. At night, when the cam follower 261 is engaging the lower portion 265 of the cam 262, then the thermostat setting is lowered to some value such as 60° F.

During the day operation, the relative energizations of the main relay windings 221 and 222 are controlled by the control arm 241 and control resistance 243 of the thermostatic mechanism 23. For this purpose the control resistance 243 is connected in parallel with the series connected main relay windings 221 and 222, through a pair of protective resistances 267 and 268, as follows: From the lower end of main relay winding 221, wire 234, wire 269, protective resistance 267, wire 270, wire 271, control resistance 243, wire 272, wire 273, wire 274, protective resistance 268, wire 275, and wire 237 to the lower end of main relay winding 222. The control arm 241 is connected to the junction of the wires 235 and 236, through the cold contact of the thermostatic mechanism 24, by a circuit as follows: Control arm 241, wire 276, cold contact 258, contact arm 257, bimetallic element 255, wire 277, and wire 279. It will be noted that this connection of the control arm 241 to the junction of these wires 235 and 236 is dependent upon the thermostatic mechanism 24 being in its cold position.

The hot contact of the thermostatic mechanism 24 is also adapted to control the relative energizations of main relay windings 221 and 222 when engaged by the contact arm 257 and for this purpose the hot contact 259 is connected to the junction of wires 272 and 273 by a wire 280.

Irrespective of the manner in which the energizations of main relay windings 221 and 222 are unbalanced, they are adapted to be rebalanced by means of a balancing potentiometer which comprises a balancing resistance 281 and a balancing contact arm 282, the latter of which is positioned by the main operating shaft 21 of the motor mechanism 22. The balancing resistance 281 is also connected in parallel with the series connected main relay windings 221 and 222 through the protective resistances 267 and 268. For this purpose the lower end of balancing resistance 281 is connected to the junction of wires 270 and 271 by a wire 283 and its upper end is connected to the junction of wires 273 and 274 by a wire 284. The balancing contact arm 282 is connected to the junction of wires 277 and 279 by a wire 285 and is, therefore, connected intermediate the main relay windings 221 and 222.

With the thermostatic mechanism 24 in the position shown, it is operating on its day cycle wherein it is set at a high value, as explained above, so that the contact arm 257 thereof continuously engages the cold contact 258. Also, as explained in connection with Fig. 1, the temperature of the return air is approximately 78° F., wherefor the control arm 241 of the thermostatic mechanism 23 is at the extreme right-hand end of the associated control resistance 243. Under these conditions, the main relay winding 222 is substantially short-circuited by a circuit as follows: From the lower end of main relay winding 222, wire 237, wire 275, protective resistance 268, wire 274, wire 273, wire 272, control arm 241, wire 276, cold contact 258, contact arm 257, bimetallic element 255, wire 277, wire 279 and wire 236 to the upper end of main relay winding 222. As a result, main operating shaft 21 has moved to such position that the valve 17A is completely closed and such that the balancing contact arm 282 is engaging the extreme lower end of balancing resistance 281. The main relay winding 221 is, therefore, substantially short-circuited by a circuit as follows: From the lower end of main relay winding 221, wire 234, wire 269, protective resistance 267, wire 270, wire 283, balancing contact arm 282, wire 285, wire 279, and wire 235, to the upper end of main relay winding 221. Since protective resistances 267 and 268 are of equal value it will be obvious that the main relay windings 221 and 222 are equally energized so that switch arm 225 is intermediate contacts 227 and 228 and is not engaging either of them.

If it should now become colder outside so that the temperature of the return air falls below 72° F., and if it be assumed that the apparatus is still operating on its day cycle, the movement of the control arm 241 across control resistance 243 towards its left-hand end will place a portion of the control resistance 243 into the previously traced substantially complete short circuit for main relay winding 222. This permits a larger flow of current through the main relay winding 222 so that it is energized more highly than the main relay winding 221. Armature 217, is therefore, rotated in a counterclockwise direction moving switch arm 225 towards contact 228. When the temperature of the return air has thus fallen sufficiently below 72° F., switch arm 225 will engage contact 228 whereupon a circuit through the auxiliary relay winding 224 and the field winding 214, in series, is established as follows: Secondary 229, wire 239, wire 287, switch arm 225, contact 228, wire 288, auxiliary relay winding 224, wire 289, field winding 214, wire 290, and wire 232 to the other side of secondary 229. Energization of field winding 214 causes rotation of main operating shaft 21 in a counter-clockwise direction as viewed from the right, whereupon the rack 19 is moved upwardly to partially open valve 17A. At the same time, balancing contact arm 282 moves upwardly along balancing resistance 281. The energization of the auxiliary winding 224 creates an additional upward pull on leg 220 of armature 217 so as to increase the pressure between switch arm 225 and contact 228. The upward movement of the balancing contact arm 282 along balancing resistance 281 inserts part of the balancing resistance in the substantial short circuit previously traced for main relay winding 221. This permits an increased energization of main relay winding 221 in respect to main relay winding 222. When the main operating shaft 21 is thus moved sufficiently far, the main relay winding 221 will be energized sufficiently to disengage switch arm 225 from contact 228. The series circuit for auxiliary winding 224 and field winding 214 is thereupon interrupted. Deenergization of the field winding 214 causes main operating shaft 21 to cease rotating. Deenergization of auxiliary winding 224 removes the additional upward pull on leg 220 of armature 217 so that switch arm 225 separates relatively widely from contact 228 to insure a good clean break between these parts. The valve 17A is now partly open.

If the temperature of the return air should continue to fall so that control arm 241 moves further towards the left along control resistance 243, further valve opening movements will take place in the manner just described above. If the control arm 241 thus moves to the extreme left-hand end of control resistance 243 by reason of a fall in the return air temperature to 68° F., then the main relay winding 221 is substantially short-circuited as follows: From the lower end of main relay winding 221, wire 234, wire 269, protective resistance 267, wire 270, wire 271, control arm 241, wire 276, cold contact 258, contact arm 257, bimetallic element 255, wire 277, wire 279 and wire 235 to the upper end of main relay winding 221. Now, in order to rebalance the energization of the main relay windings, balancing contact arm 282 will have to move to the extreme upper end of balancing resistance 281 and, when this occurs, a substantial short circuit for main relay winding 222 is established as follows: From the lower end of main relay winding 222, wire 237, wire 275, protective resistance 268, wire 274, wire 284, balancing contact arm 282, wire 285, wire 279, and wire 236 to the upper end of main relay winding 222. Movement of main operating shaft 21 to such position as to cause movement of contact arm 282 to the extreme upper end of balancing resistance 281 causes a complete opening of the valve 17A.

If at any time there should be a rise in the return air temperature so that control arm 241 moves along control resistance 243 towards its right-hand, then the opposite action takes place in that main relay winding 221 becomes sufficiently more highly energized than main relay winding 222 as to cause movement of switch arm 225 into engagement with contact 227. A series circuit for auxiliary winding 223 and field winding 215 is then established as follows: Secondary 229, wire 239, wire 287, switch arm 225, contact 227, wire 291, auxiliary winding 223, wire 292, field winding 215, wire 290 and wire 232 to secondary 229. Energization of auxiliary winding 223 increases the contact pressure between switch arm 225 and contact 227 as will now be apparent. Energization of field winding 215 causes rotation of main operating shaft 21 in an opposite direction so as to move valve 17A towards closed position and move balancing contact arm 282 along balancing resistance 281 towards its lower end whereby to rebalance the energizations of main relay windings 221 and 222 and separate switch arm 225 from contact 227.

It will, therefore, be seen that with the time operated thermostatic mechanism 24 operating on a day cycle, the motor mechanism 22 is operated in a proportioning or modulating manner such as is now well known in the art. In other words, the valve 17A assumes a position corresponding to the position of control arm 241 in respect to the control resistance 243. While the limit positions of the main operating shaft 21 have been herein described as being obtained through a balancing out of the main relay windings 221 and 222 by the operation of the balancing potentiometer, it will be apparent that the usual limit switches may be employed in order to accurately obtain these limit positions.

The temperature during the day is thus maintained between 68° F. and 72° F. At night, the setting of the thermostat 24 is reduced to approximately 60° F. by the cam 262. Since the room temperature, or the temperature of the air withdrawn therefrom, is between 68° F. and 72° F., it will be apparent that the contact arm 257 will engage the hot contact 259. When this is done, main relay winding 222 is substantially short-circuited as follows: From the lower end of main relay winding 222, wire 237, wire 275, protective resistance 268, wire 274, wire 273, wire 280, hot contact 259, contact arm 257, bimetallic element 255, wire 277, wire 279, and wire 236 to the upper end of main relay winding 222. Main relay winding 221 will, therefore, be more highly energized than main relay winding 222 and switch arm 225 will engage contact 227 to rotate main operating shaft 221 to such position that the valve is fully closed, as shown in Fig. 2, and wherein balancing contact arm 282 engages the extreme lower end of balancing resistance 281 in order to again rebalance the energization of the main relay windings 221 and 222. The valve 17A will thus be maintained closed at night except in the event the temperature of the room should fall below the night setting of the thermostat 24 so as to cause contact arm 257 to disengage the hot contact 259 and re-engage the cold contact 258. When this occurs, the control arm 241 is again connected in circuit with the system. Since the night setting of the thermostatic mechanism 24 is 60° F. and since the lowest end of the range of the thermostatic mechanism 23 is 68° F., if this condition should arise the control arm 241 will be engaging the extreme left-hand end of the control resistance 243 wherefor the valve 17A will be immediately moved to its full open position. As soon as the temperature of the room is raised above 60° F. the contact arm 257 will again disengage the cold contact 258 and re-engage the hot contact 259 so as to again completely close the valve 17A.

It will be noted that the main operating shaft 21 is provided with a cam 295. This cam cooperates with a switch arm 296 which in turn is associated with a switch arm 297. Whenever the main operating shaft 21 moves out of that position in which the valve 17A is completely closed, this cam 295 moves switch arm 296 into engagement with switch arm 297. In other words, whenever the valve 17A is initially opened even a small amount, the upraised portion 298 of the cam 295 moves switch arm 296 into engagement with switch arm 297. Valve 35, which controls the flow of gas to the boiler 31, is thereupon energized as follows: Line wire 299, wire 300, switch arm 296, switch arm 297, wire 301, wire 302 and valve 35, to line wire 303. Therefore, if an apparatus such as a boiler 31 is utilized to supply heating fluid, the cam 295 causes operation thereof whenever the valve 17A is initially opened. The upraised portion 298 of the cam 295 is sufficiently long that the switch arms 296 and 297 are then maintained in engagement throughout subsequent further opening movements of valve 17A even though such valve moves to its full open position. Stated in another way, whenever the valve 17A is in any position except full closed position, the valve 35 will be energized to cause heating of the boiler 31.

As pointed out above, the air conditioning system is supplemented by direct radiation in the form of the radiator 28 so that additional heat can be furnished to the room or space 11 if the heating coil 17 of the air conditioning apparatus does not have sufficient capacity to maintain the desired room or space temperature under severe weather conditions. This auxiliary radiator 28 is controlled by the valve 29, which in turn is controlled by the thermostatic mechanism 30. This thermostatic mechanism 30 includes a bimetallic operating member 304 which positions a contact arm 305 that cooperates with cold and hot contacts 306 and 307. This thermostatic mechanism 30 again includes an adjusting mechanism similar to that of the thermostatic mechanism 24 and which is herein generally indicated at 308, it not being thought necessary to again describe in detail these similar parts.

With the parts in the position shown, the thermostat is operating on a day cycle. The setting of this thermostat during the day is such that the hot contact 307 is engaged when the room or space temperature is 70° F. and the cold contact 306 is engaged when the room or space temperature falls to 68° F. Since the present prevailing temperature is 78° F., as explained in connection with Fig. 1, contact arm 305 is engaging the hot contact 307 so that a closing circuit for valve 29 is established as follows: Line wire 309, bimetallic element 304, contact arm 305, hot contact 307, wire 310 and valve 29, to line wire 311. Whenever the temperature of the room falls to 68° F., contact arm 305 engages the cold contact 306 to complete an opening circuit for valve 29 as follows: Line wire 309, bimetallic element 304, contact arm 305, cold contact 306, wire 312, and valve 29 to line wire 311.

The valve 29 not only admits the flow of heating medium to the radiator 28 when it opens but also lifts upwardly a lever 313 which supports a mercury switch 314. The mercury switch 314 is thus moved to closed circuit position upon opening of valve 29 and completes a circuit to the gas controlling valve 35 as follows: Line wire 299, wire 315, mercury switch 314, wire 316, wire 302, and gas valve 35 to line wire 303. Therefore, whenever the direct radiation 28 is placed in operation, the valve 35 is energized. The night setting of the thermostat mechanism 308 may be as desired, either higher or lower than the night setting of the thermostatic mechanism 24, and except under unusual settings of these thermostats this auxiliary control of the valve 35 by the mercury switch 314 is unnecessary.

From the foregoing description it will be evident that during the day and during cold weather conditions the valve 17A is modulated or proportioned or graduatingly positioned in accordance with the fluctuations of the temperature of the air being withdrawn from the room or space 11. At night, the valve is completely closed except in the event that the room or space temperature falls to some low value whereupon the valve is immediately completely opened until the room or space temperature rises somewhat. In addition, a direct heating system in the form of auxiliary radiation is provided under the control of a separate room thermostat whereby the action of the air conditioning system can be supplemented during cold weather if this be needed. Operation of either the valve 17A of the air conditioning apparatus, or the valve 29 of the direct radiation, places the boiler 31 in operation. Of course, the boiler 31 could be controlled in other manners or the supply of heating fluid could be obtained from some central source, in which case the auxiliary controls for this boiler that are operated by the main operating shaft 21 and the valve 29 could be eliminated.

Referring now to Fig. 3 of the drawings, the control and operation of the fresh air damper 40, both in cold and warm weather, will be explained. As has been previously briefly pointed out in connection with the general discussion of Fig. 1 of the drawings, the damper 40 is connected to a shaft 42 of the motor mechanism 43 through cranks 44 and 45, and a link 46. The connection between the link 46 and the crank 44 is not a rigid connection but is a lost motion connection. For this purpose, the crank 44 is provided with a pin 320 which is received by an elongated slot 321 formed in the link 46. A coiled spring 322 has one of its ends secured to a suitable support 323 and is other end secured to the crank 44 and operates normally to maintain the upper end of the slot 321 in registry with a pin 320. In actual practice, the shaft 42 is the main driving shaft of the motor mechanism 43, but for convenience of illustration, the main operating shaft is shown herein at 324, and the shaft 42 is coupled thereto through a pair of bevelled gears 325 and 326. This main operating shaft 324 is connected to a rotor shaft 327 through the medium of a reduction gearing generally indicated at 328. Secured to the rotor shaft 327 is a motor rotor 329 with which are associated three field windings, 330, 331 and 332. This motor mechanism 43 is of the so-called power failure type wherein it returns to a definite position whenever the supply of power is interrupted, such return being accomplished by the spring 322. The field winding 332 is arranged in such a manner that it has sufficient power to maintain the motor mechanism in any position to which it is moved. The field winding 330, taken together with the field winding 332, has sufficient power to move the motor mechanism to a new position against the biasing action of the spring 322. The field winding 331 is a neutralizing, or bucking, winding, which neutralizes the effect of the holding winding 332 so that if only these two windings 331 and 332 are energized, the resultant effect is the same as if the motor were entirely deenergized. As a result, under these conditions, the motor mechanism returns to an extreme position under the action of biasing spring 322.

The energizations of windings 330 and 331 are controlled by a relay mechanism which includes an armature 333 that is pivoted at 334. This armature is further provided with legs 335 and 336. Cooperating with the leg 335 is a main relay winding 337 and an auxiliary relay winding 338. Similarly, a main relay winding 339 and an auxiliary relay winding 340 cooperate with the leg 336 of the armature 333. Secured to this armature 333, through the medium of a block of insulating material 341, is a switch arm 342 which is disposed between a pair of contacts 343 and 344. The main relay windings 337 and 339 are connected in series across the secondary 345 of a transformer 346 having a primary 347 that is connected to line wires 348 and 349. This series circuit is as follows: Secondary 345, wire 350, wire 351, wire 352, wire 353, main relay winding 337, wire 354, wire 355, main relay winding 339, wire 356, wire 357 and wire 358 to the other side of secondary 345. If there were no other circuit connections it will be obvious that these main relay windings 337 and 339 would be continuously equally energized so that armature 333 would be maintained in the position shown wherein switch arm 342 is disposed between contacts 343 and 344 and does not engage either of them. The various field windings of the motor are additionally controlled in part by a pair of switches defined by switch arms 359, 360, 361 and 362. The switch arms 359 and 360 cooperate with each other, as do the switch arms 361 and 362. These two switches are controlled by an actuator of insulating material 363 which is connected to a stud shaft 364 that in turn is connected to a bevelled gear 365 which cooperates with a second bevelled gear 366 that is mounted upon the main operating shaft 324. As a result, the actuator 363 is moved in conformity with the movements of the main operating shaft 324. This actuator is provided with two extensions indicated at 367 and 368. Upon extreme counter-clockwise movement of the actuator 363, the extension 367 engages switch arm 361 and separates it from switch arm 362. Likewise, upon extreme clockwise rotation of the actuator 363, the extension 368 thereof engages the switch arm 360 and moves it away from switch arm 359. Also secured to the actuator 363 is a balancing contact arm 369 which cooperates with a balancing resistance 370 for a purpose to be described hereinafter.

During warm weather, the respective energizations of the main relay windings 337 and 339 are adapted to be varied by the control resistance 110 of the thermostatic mechanism 47, which has been previously described in detail and which responds to the temperature of the air withdrawn from the room or space 11. During cold weather, the respective energizations of the main relay windings 337 and 339 are adapted to be varied primarily by the control resistance 245 of the thermostatic mechanism 23, which has previously been described as likewise responding to the temperature of the air being withdrawn from the room or space 11. In addition, during cold weather, under certain conditions, the relative energizations of the relay windings 337 and 339 are adapted to be varied by the thermostatic controller 48 which has only been briefly referred to hereinbefore.

This thermostatic controller 48 includes a bell crank having a control arm 371 and an actuating arm 372. The control arm 371 cooperates with a control resistance 373. The actuating arm 372 is positioned by one end of a bellows 374, the other end of which is supported by a suitable support 375. The bellows 374 is connected to a controlling bulb 376 by a connecting tube 377. The bellows, bulb and tube are charged with volatile fluid as is usual in the art wherefor variable pressures are created in the bellows 374 as the temperature to which the controlling bulb 376 responds varies. These variable pressures are opposed by a coiled spring 378 which has one of its ends secured to the actuating arm 372 and its other end secured to the support 375. In the instant invention, this controller 48 is utilized to prevent the temperature of the mixture of fresh and return air from falling below a predetermined minimum value and the controlling bulb 376 thereof is therefore placed in the entrance of the air conditioning chamber 10 where it is subjected to a mixture of such fresh and return air.

In order to modify the operation of the apparatus in a manner to be explained hereinafter, a three-gang rheostat is provided which comprises a main operating shaft 380 that is provided with an operating handle 381. Secured to this operating shaft 380 are three rheostat arms 382, 383 and 384. These three rheostat arms respective'y coperate with three rheostat resistances 385, 386 and 387.

The junction of wires 352 and 353, and therefore the lower end of main relay winding 337, is connected to the rheostat arm 382 by means of a wire 388. In a similar manner, the junction of wires 356 and 357, and, therefore, the lower end of main relay winding 339, is connected to the rheostat arm 384 by a wire 389. The third rheostat arm 383 is connected to the junction of wires 354 and 355 by a wire 390 and is therefore connected intermediate the main relay windings 337 and 339. The rheostat resistance 385 is connected to the left-hand end of control resistance 110 of the thermostatic mechanism 47 and to the left-hand end of the balancing resistance 370, through a resistance 391, by means of wires 392 to 395, inclusive. One end of the rheostat resistance 387 is connected to the right-hand end of control resistance 373, to the right-hand end of control resistance 110, and to the left-hand end of control resistance 245, by means of wires 286 and 396 to 400, inc'usive. The left-hand end of control resistance 373 is connected to the control arm 242 by a wire 401 and the right-hand end of control resistance 245 is connected to the control arm 107 by a wire 402. The control arm 371 and the balancing contact arm 369 are connected to the center of the third rheostat resistance 386 by means of wires 403 to 406, inclusive. The right-hand end of balancing resistance 370 is connected to the junction of wires 403 and 404, through a resistance 407, by wires 408, 421 and 409.

The parts are shown in the position they assume under the conditions set forth in Fig. 1. In other words, the return air temperature is substantially 78° F. wherefor the control arm 107 is engaging substantially the center of control resistance 110, whereas the control arm 242 is engaging the extreme right-hand end of the control resistance 245. The thermostatic controller 48 may have a range, for instance, from 38° F. to 42° F., and with the outside temperature at substantially 87½° F. and the return air temperature at 78° F. it will be clear that the control arm 371 will be located at or beyond the extreme left-hand end of the control resistance 373. The damper 40 is half open so as to provide a mixture of half fresh air and half return air to the air conditioning chamber 10 and in order to maintain it in such half-open position it is necessary for the holding winding 332 to be energized. This energizing circuit is as follows: Secondary 345, wire 358, wire 410, a resistance 411, wire 412, switch arm 362, switch arm 361, wire 413, holding winding 332 and wire 414 to wire 350 and the other side of secondary 345. The damper 40 is thus held in its intermediate position by reason of the energization of the holding winding 332.

Half of the control resistance 110 is connected in parallel with the main relay winding 337, under the existing conditions, by a circuit as follows: From the lower end of this main relay winding 337, wire 353, wire 388, rheostat arm 382, rheostat resistance 385, wire 392, wire 393, control resistance 110, control arm 107, wire 402, control arm 242, wire 401, control arm 371, wire 403, wire 404, wire 406, rheostat resistance 386, rheostat arm 383, wire 390, and wire 354 to the upper end of main relay winding 337. In a similar manner, the other half of control resistance 110 is connected in parallel with the main relay winding 339 as follows: From the lower end of main relay winding 339, wire 356, wire 389, rheostat arm 384, rheostat resistance 387, wire 286, wire 396, wire 398, wire 399, control resistance 110, control arm 107, wire 402, control arm 242, wire 401, control arm 371, wire 403, wire 404, wire 406, rheostat resistance 386, rheostat arm 383, wire 390 and wire 355, to the upper end of main re'ay winding 339. Also, half of the balancing resistance 370 is connected in parallel with the main relay winding 337 as follows: From the lower end of main relay winding 337, wire 353, wire 388, rheostat arm 382, rheostat resistance 385, wire 392, wire 394, resistance 391, wire 395, balancing resistance 370, balancing contact arm 369, wire 405, wire 406, rheostat resistance 386, rheostat arm 383, wire 390 and wire 354 to the upper end of main relay winding 337. Also, the other half of balancing resistance 370 is connected in parallel with the main relay winding 339 as follows: From the lower end of main relay winding 339, wire 356, wire 389, rheostat arm 384, rheostat resistance 387, wire 286, wire 408, balancing resistance 370, balancing contact arm 369, wire 405, wire 406, rheostat resistance 386, rheostat arm 383, wire 390 and wire 355 to the upper end of main relay winding 339. The net result of all of these circuits is that the main relay windings 337 and 339 are equally energized so that the switch arm 342 is disposed intermediate contacts 343 and 344.

Assuming that the return air temperature should fall for some reason, then the control arm 107 will move towards the left-hand end of control resistance 110 so that less of this control resistance 110 will be in parallel with the main relay winding 337. Less current will, therefore, flow through this main relay winding 337 and more will flow through this parallel circuit set out above wherefore main relay winding 339 becomes more highly energized than the main relay winding 337. Armature 333, therefore, moves in a counter-clockwise direction so as to swing switch arm 342 towards contact 343. When this temperature drop has been sufficient, the switch arm 342 will engage contact 343 whereupon a series circuit for the auxiliary winding 340 and the opening coil 330 will be established as follows: Secondary 345, wire 350, wire 351, wire 415, switch arm 342, contact 343, wire 416, auxiliary winding 340, wire 417, opening winding 330, wire 418, switch arm 359, switch arm 360, wire 419, wire 410 and wire 358 to the other side of secondary 345. The energization of the auxiliary winding 340 causes an additional upward force to be exerted on leg 336 of armature 333 wherefor to hold switch arm 342 in firm engagement with contact 343. Remembering that the holding winding 332 was already energized, the combined energization of this holding winding 332 and the opening winding 330 enables the motor 329 to rotate link 45 in a clockwise direction so as to move damper 40 to a more wide-open position allowing more fresh air and less return air to be delivered to the air conditioning chamber 10. Such movement also causes clockwise rotation of balancing contact arm 369 with respect to balancing resistance 370 so that part of the balancing resistance 370 in the shunt circuit for main relay winding 339, as traced above, is eliminated. This decreases the flow of current through the main relay winding 339 so that armature 333 moves back towards the position shown in Fig. 3. When the damper has thus been opened an amount proportionate to the movement of control arm 107, then switch arm 342 will separate from contact 343 and deenergize the auxiliary winding 340 and the opening winding 330. Deenergization of the auxiliary winding 340 removes the additional pull on leg 336 of armature 333 so that switch arm 342 separates relatively widely from contact 343. The damper 40 is now held in its new position against the biasing action of spring 322 by the energization of the holding winding 332 which is still energized by the circuit set forth above.

If the temperature should continue to fall, further opening movements of the fresh air damper 40 will take place and, if the temperature falls to 74° F., then the control arm 107 will engage the extreme left-hand end of resistance 110. The balancing contact arm 369 must then move to the extreme right-hand end of balancing resistance 370 in order to balance out the energizations of main relay windings 337 and 339. Also, at this time, the extension 368 of actuator 363 engages switch arm 360 and moves it from engagement with switch arm 359 wherefor to deenergize the opening winding 330. While this probably would come about as a result of balancing out of the energizations of relay windings 337 and 339, this provision of the limit switch comprises by switch arms 359 and 360 provides a much more accurate stopping of the motor mechanism when the damper 40 has been moved to its full open position.

Whenever there is an increase in the temperature of the return air, control arm 107 will move to the right along control resistance 110 whereupon the main relay winding 337 will become sufficiently more highly energized than the relay winding 339 to move switch arm 342 into engagement with contact 344. When this occurs, the auxiliary winding 338 and the bucking winding 331 will be energized, in series, as follows: Secondary 345, wire 350, wire 351, wire 415, switch arm 342, contact 344, wire 425, auxiliary winding 338, wire 426, bucking winding 331, wire 413, switch arm 361, switch arm 362, wire 412, resistance 411, wire 410 and wire 358 to the other side of secondary 345. Energization of the bucking winding 331, as previously set forth, offsets the effect of energization of holding winding 332 and, it being remembered that the opening winding 330 is deenergized at this time, the biasing spring 322 is effective to move the damper 40 towards closed position. This action rotates the main operating shaft 324, associated reduction gearing 328, and the motor rotor 329 in reverse direction. Such operation of the parts causes movement of balancing contact arm 369 in a left-ward direction. When this balancing contact arm has moved sufficiently far, the energizations of the main relay windings 337 and 339 will again be so nearly equalized as to cause movement of switch arm 342 from engagement with contact 344 whereupon the auxiliary winding 338 and the bucking winding 331 are deenergized. Deenergization of the auxiliary winding 338 permits a good wide separation between the switch arm 342 and contact 344 and deenergization of the bucking winding 331 again enables the holding winding 332 to maintain the damper in its new position.

If the temperature should raise still further, this action will be repeated and when the return air temperature reaches 82° F. so that control arm 107 engages the extreme right-hand end of control resistance 110, then the balancing resistance and balancing contact arm will be unable to rebalance the energizations of the main relay windings 337 and 339 by reason of the inclusion of resistance 391 in the circuit. This means that the damper will go to its full closed position and, in so doing, the extension 367 of the actuator 363 engages switch arm 361 and moves it away from switch arm 362 whereupon both the circuit for the holding winding 332 and the circuit for the bucking winding 331 are simultaneously deenergized so that there is no power whatsoever on the motor. At the time that the damper 40 reaches a full closed position, the momentum built up in the reduction gearing and the rest of the parts enables the motor mechanism to move still further in closing direction, which is in turn permitted by the lost motion connection between the crank 31 and the link 46.

On a subsequent fall in the return air temperature below 82° F., the switch arm 342 will again engage the contact 343 to energize the opening winding 330. At this time the holding winding 332 is not energized, but the opening winding can move the motor mechanism since there is no load upon it by reason of the fact that the lost motion between the crank 41 and link 46 is first taken up. By the time this lost motion has been taken up, then the switch comprised by switch arms 361 and 362 has been permitted to re-close so that as soon as actual load is thrown on the motor mechanism the holding winding 332 will also be energized as well as the opening winding 330.

When the weather becomes cold, the return air temperature will drop below 74° F., and in fact will drop to at least 72° F. When this occurs, the control arm 107 will be engaging the extreme left-hand end of control resistance 110 so that the wire 393 is now directly connected to the wire 402. In cold weather, the return air controller 23 operates the damper 40 in the opposite manner than does the return air controller 47 which controls the same during warm weather. In other words, the controller 23 moves the damper from full open position to full closed position as the return air temperature drops, whereas the controller 47 moves the fresh air damper from full open position to full closed position as the return air temperature rises.

Assuming the above condition of 72° F. return air temperature so that wire 393 is connected directly to wire 402, then wire 401 will also be directly connected to wire 402. Under these conditions, the main relay winding 337 will be substantially short-circuited as follows: From the lower end of main relay winding 337, wire 353, wire 388, rheostat arm 382, rheostat resistance 385, wire 392, wire 393, wire 402, wire 401, control arm 371, wire 403, wire 404, wire 406, rheostat resistance 386, rheostat arm 383, wire 390 and wire 354 to the upper end of main relay winding 337. Relay winding 339 therefore moves switch arm 342 into engagement with contact 343 and the motor mechanism is operated to move the damper to its full open position wherein balancing contact arm 369 engages the extreme right-hand end of balancing resistance 370. When this occurs, the main relay winding 339 will also be substantially short-circuited as follows: From the lower end of main relay winding 339, wire 356, wire 389, rheostat arm 384, rheostat resistance 387, wire 286, wire 408, balancing contact arm 369, wire 405, wire 406, rheostat resistance 386, rheostat arm 383, wire 390, and wire 355 to the upper end of main relay winding 339. This would again balance the energizations of the relay windings 337 and 339, but, as explained above, this is not relied upon for the end position, the extension 368 of the actuator 363 opening the limit switch comprised by switch arms 359 and 360 when the damper has been moved to full open position.

If the return air temperature continues to fall and falls below 72° F., then the substantial short-circuit traced above is rendered less effective since part of the control resistance 245 will be included therein. This means that the balancing contact arm 369 must move towards the left away from the extreme right-hand end of balancing resistance 370 in order to again balance out the energizations of the main relay windings 337 and 339. The damper 40, therefore, closes somewhat. As the temperature of the return air continues to fall, the damper will be moved towards more nearly full closed position, and if the temperature falls to 68° F. so that the control arm 242 engages the extreme left-hand end of control resistance 245, then the damper 40 will be completely closed in a manner which should now be understood.

If at any time the mixture of return and fresh air should fall below 42° F., the control arm 371 will move along control resistance 373 towards the right and insert part of this control resistance between the wires 401 and 403. This has the same general effect as movement of control arm 242 to the left along control resistance 245. In other words, the effect of such lowering in the temperature of the mixture of return and fresh air is to cause a further closing movement of the fresh air damper whereby to raise the temperature of this mixture. The controller 48 therefore acts as a low limit control in respect to the temperature of the mixture of fresh and return air.

The provision of the manually operable rheostat makes it possible to insert more or less resistance in circuit with one or the other of the main relay windings 337 and 339 wherefore a complete opening or a complete closing movement of the damper 40 can be prevented. This is desirable in that it may not be desired to completely close the fresh air damper either in summer or winter operation, even though the return air temperature becomes respectively too high or too low, since under certain circumstances a minimum amount of fresh air should be taken in at all times for ventilation purposes. The provision of resistance 411 is for the purpose of limiting the flow of current when the holding and bucking windings of the motor are simultaneously energized and are bucking each other since under these conditions the current flow would increase considerably were it not for the limiting action of this resistance 411.

From the foregoing it will be evident that the fresh air damper is moved from full open position to full closed position during the summer upon a rise in the return air temperature of from 74° F. to 82° F. Conversely, in the winter, the fresh air damper is moved from full open position to full closed position upon a drop in the return temperature of from 72° F. to 68° F. In addition, the fresh air damper is moved towards closed position if the mixture of fresh and return air falls to some low temperature such as 42° F., which, of course, would only occur during cold weather operation. It should be noted that the different cycles of control in the summer and in the winter are obtained entirely by the manner in which the summer and winter thermostats are interconnected and adjusted. No manual or automatic switching means is necessary to throw one or the other of these controllers into control of the damper since the various controllers in and of themselves by going to an extreme position which is outside of the range of such controller, places another controller in absolute control of the fresh air damper.

As indicated above, a reversely acting return air damper could be used in conjunction with the fresh air damper.

Referring again to Fig. 1 of the drawings, it will be seen that the wire 349 for the motor mechanism 43 is connected to ground 69 and that the wire 348 is connected to the main source of power, indicated at 430, through a line switch 431. As has been explained above, complete deenergization of the motorized mechanism for operating the fresh air damper results in movement of the fresh air damper to closed position. Therefore, if the line switch 431 is opened the fresh air damper will move to closed position irrespective of the condition of any of the controllers and irrespective of the temperature conditions to which they are subjected. This line switch also upon opening serves to deenergize the fan motor 16 by a circuit which is obvious upon an inspection of Fig. 1.

To recapitulate, during the summer, the fresh air damper is moved from full open position at a temperature of 74° F. in the room or of the air withdrawn therefrom to full closed position if the temperature of such air rises to 82° F. By means of the rheostat referred to above, however, a minimum opening of the damper may be obtained irrespective of how high this temperature goes in order to provide satisfactory ventilation. In addition, cooling is furnished whenever the temperature of the return air becomes too high and the temperature value at which such cooling will occur is modified by the space relative humidity and by the outdoor temperature in such manner that higher return air temperatures are carried as the relative humidity decreases and as the outdoor temperature rises. This in effect gives what is known as an effective temperature control, the value of which is varied in accordance with the fluctuations in outdoor temperature but the differential between the outdoor temperature and the effective temperature maintained within the space is not maintained constant. It is increased as the outdoor temperature becomes higher and higher.

In the winter, this same fresh air damper, through the medium of another controller which is automatically placed into control by the summer controller going to one of its extreme positions, moves the fresh air damper from full open position to full closed position as the return air temperature falls from 72° F to 68° F. Here again, the manual rheostat may be utilized to maintain a minimum opening of the fresh air damper irrespective of the temperature of the return air. In addition, during the winter the fresh air damper is also controlled in accordance with the temperature of a mixture of the fresh and return air so that this mixture cannot fall below some predetermined value which is herein shown as 38° F. Also, during the winter the supply of heat to the air conditioning apparatus is graduatingly controlled in accordance with fluctuations in return air temperature during the day cycle but is completely turned off at night. However, if during the night the temperature of the space being controlled should fall to some minimum value then the air conditioning apparatus is operated at full heating capacity until this temperature is raised somewhat. In addition, direct radiation is provided to supplement the action of the air conditioning apparatus if the outside weather conditions become so severe that the air conditioning apparatus does not maintain the desired temperature in the space. The direct radiation control is also provided with apparatus so that the temperature to which it responds during the night is lowered in conformity with the lowering of the setting of the air conditioning apparatus. Furthermore, regardless of which calls for heat, the air conditioning apparatus or the direct radiation, provision is made for operating a boiler or other heating apparatus so that heating medium will be available. Also, whenever cooling is not taking place a relative humidity control is enabled to add moisture to the air so as to raise the relative humidity of the space and this relative humidity control has its operation varied so as to maintain lower relative humidities as the outdoor temperature decreases. This is simply obtained in the present invention by placing the relative humidity control in close proximity to an exposed surface, such as a window, as has been previously explained in detail.

Also, during the cooling cycle, provision is made for reheating the air if necessary under the control of discharged air temperature and specifically by utilizing the hot gaseous refrigerant for such reheating.

It is to be understood that the various values set forth in this application are exemplary only and that the various controls described have the usual adjusting means common in such controls. It will be obvious that numerous changes can be made in the present system without departing from the spirit of the invention and we, therefore, intend to be limited only by the scope of the appended claims.

We claim:

1. In a ventilating system, in combination, damper means in control of the flow of fresh air to a space, electrical means in control thereof, a first variable reactance condition responsive controller in control of said electrical means to operate the damper means in one manner and having a predetermined range of response, a second variable reactance condition responsive controller in control of said electrical means to operate the damper means in a different manner and having a different range of response, and connections between said controllers and electrical means by which one of said controllers in responding to a condition value at one end of its range of response places the other condition responsive controller in control of the electrical means.

2. In combination, electrical means to be controlled in at least two different manners, a first variable reactance controller for controlling said electrical means in one manner, a second variable reactance controller for controlling said electrical means in another manner, and connections between said controllers and electrical means by which extreme movement of either controller places the other controller in control of said electrical means.

3. In combination, means to be controlled, first and second electrical devices connected in series in control of said means, first and second controlling potentiometers, a circuit connecting one end of the resistance of the first controlling potentiometer to one end of the first electrical device, a circuit connecting the other end of said resistance to one end of the resistance of the other controlling potentiometer and to one end of the other electrical device, a circuit connecting the movable contact of said first controlling potentiometer to the other end of the resistance of said second controlling potentiometer, a circuit connecting the movable contact of said second controlling potentiometer intermediate said series connected electrical devices and condition responsive means for actuating said first and second controlling potentiometers, said condition responsive means being arranged to actuate said controlling potentiometers in a manner to cause control of said means to be controlled in different manners by said controlling potentiometers.

4. A combined cooling and humidifying system, comprising, in combination, electrically controlled cooling means, a relay in control thereof to cause a cooling effect when moved to a first position, space temperature responsive means to move said relay to said first position when the space temperature rises above the setting thereof, outside temperature responsive means for adjusting said space temperature responsive means, humidifying means, a humidity responsive switch in control thereof, and a switch closed by said relay when not in said first position to permit control of said humidifying means by said humidity responsive switch.

5. A combined cooling and humidifying system for a space to be controlled, comprising, in combination, humidifying means for humidifying the space, humidity responsive means in control thereof and located in the space in proximity to an exposed surface thereof, means to cool the space, and temperature responsive means operative to render said cooling means effective and to prevent control of the humidifying means by the humidity responsive means.

6. A heating system of the class described, comprising, in combination, means to heat a space, means to control said heating means to vary graduatingly the effect of said heating means upon the space, means to control said heating means to render it effective at its highest capacity or render it ineffective, and timing means to select the manner in which said heating means is controlled.

7. A heating system of the class described, comprising, in combination, heating means, motor means in control of the effect thereof and operable from one extreme position to a second extreme position, a first temperature responsive controller to control said motor means in a graduated manner, a second temperature responsive controller operative to render the heating means ineffective, and timing means operative to place said motor means under the control of said first temperature responsive controller.

8. In combination, a temperature changer, electric means in control thereof, a thermostatic variable resistance responsive controller in control of said electric means to graduatingly vary the effect of said temperature responsive controller, a thermostatic switching mechanism operable to permit control of said electrical means by said controller or to operate said electrical means to an extreme position, and timing means to vary the setting of said thermostatic switching mechanism to adjust its response to a value such that said controller will be placed in control of said electrical means or to another value at which the thermostatic switching means may control said electrical means.

9. In an air conditioning system, in combination, a conditioning chamber, means including a fan for causing a flow of air from said conditioning chamber to a space to be conditioned, means for supplying fresh air to said space, damper means for controlling the supply of fresh air, damper motor means for actuating said damper means, a pair of temperature responsive controllers for conjointly controlling said motor means, said controllers being arranged to respond to different values of temperature and being connected to said motor means in a manner to control said motor means in different manners, and means for causing said damper motor means to assume a position in which the fresh air damper is substantially closed irrespective of said controllers when a predetermined portion of the air conditioning system is placed out of operation.

10. In an air conditioning system, in combination, a conditioning chamber, means including a fan for causing a flow of air from said conditioning chamber to a space to be conditioned, means for supplying fresh air to said space, damper means for controlling the supply of fresh air, damper motor means for actuating said damper means, a pair of temperature responsive controllers for conjointly controlling said motor means, said controllers being arranged to respond to different values of temperature and being connected to said motor means in a manner to control said motor means in different manners, means for preventing complete closing of said fresh air damper by said motor means under the control of said pair of controllers for thereby maintaining a minimum fresh air supply while the system is in operation, and means for causing said damper motor means to assume a position in which the fresh air damper is substantially closed irrespective of said controllers when a predetermined portion of the air conditioning system is placed out of operation.

11. In a system of the class described, in combination, a potentiometer controlled positioning motor, a condition responsive device, a potentiometer controller actuated by said condition responsive device and connected to said motor for controlling said motor graduatingly in accordance with changes in the condition to which said condition responsive device responds, a second condition responsive device, a switch actuated by said second condition responsive device, said switch being interposed in the connections between said potentiometer controller and said motor, and timing means for adjusting said second condition responsive device.

12. In a system of the class described, in combination, a controller for controlling a medium to be controlled, electric motor means for controlling said controller, and variable resistance control means for controlling said electric motor means, said variable resistance control means including a first variable resistance controller and a second variable resistance controller, condition responsive means for actuating each of said variable resistance controllers in accordance with variations in the same condition, said first variable resistance controller being arranged to cause movement of said motor means in one direction as said condition increases in value from a predetermined value to another, and said second variable resistance controller being arranged to cause movement of said motor means in the same direction when said condition falls below a predetermined value.

13. In an air conditioning system, in combination, a conditioning chamber for supplying conditioned air to a space being conditioned, means for passing a stream of fresh air to said chamber, means for passing a stream of return air from said space to said chamber, means for mixing the streams of fresh air and return air passing to said chamber, damper means for controlling the supply of fresh air, damper motor means for actuating said damper means, a pair of temperature responsive controllers connected to said damper motor means, one of said controllers responding to a relatively high range of temperature variation and being arranged to cause said damper motor means to reduce the flow of air upon rise in temperature, the other of said controllers responding to a lower range of temperature variation and causing said damper motor means to reduce the flow of fresh air upon fall in temperature, and a third controller responsive to the temperature of the mixture of fresh air for controlling said motor means, said third controller being arranged to place said pair of temperature responsive controllers in full control of said motor means when the temperature of the mixture is at a desired value, while closing said damper means independently of said pair of controllers when the mixture temperature varies to an undesired value.

14. In an air conditioning system, in combination, a conditioning chamber for supplying conditioned air to a space being conditioned, means for passing a stream of fresh air to said chamber, means for passing a stream of return air from said space to said chamber, means for mixing the streams of fresh and return air passing to said chamber, air conditioning means in said chamber for varying the temperature of said mixture, damper means for controlling the supply of fresh air, damper motor means for actuating said damper means, a first thermostat responsive to the initial temperature of the mixture of fresh and return air for controlling said damper motor means in a manner to graduatingly cause closing of said damper means upon decrease in said initial temperature of said mixture, and a second thermostat responsive to the temperature of one only of said streams of air for cooperating with said first thermostat in controlling said damper motor means in a manner to close said damper means upon increase in temperature at said second thermostat.

15. In an air conditioning system, in combination, a conditioning chamber for supplying conditioned air to a space being conditioned, means for passing a stream of fresh air to said chamber, means for passing a stream of return air from said space to said chamber, means for mixing the streams of fresh and return air passing to said chamber air conditioning means in said chamber for varying the temperature of said mixture, damper means for controlling the supply of fresh air, damper motor means for actuating said damper means, a first thermostat responsive to the initial temperature of the mixture of fresh and return air for controlling said damper motor means in a manner to graduatingly cause closing of said damper means upon decrease in said initial temperature of said mixture, and a second thermostat responsive to the temperature of the return air only for cooperating with said first thermostat in controlling said damper motor means in a manner to close said damper means upon increase in temperature at said second thermostat.

16. In an air conditioning system, in combination, a conditioning chamber for supplying conditioned air to a space being conditioned, means for passing a stream of fresh air to said chamber, means for passing a stream of return air from said space to said chamber, means for mixing the streams of fresh and return air passing to said chamber, air conditioning means in said chamber for varying the temperature of said mixture, damper means for controlling the supply of fresh air, damper motor means for actuating said damper means, a first thermostat responsive to the initial temperature of the mixture of fresh and return air for controlling said damper motor means graduatingly in accordance with variations in said initial mixture temperature and to insure closure of said damper at a predetermined temperature which is not variable during normal operation, and a second thermostat responsive to the temperature of one only of said streams of air for cooperating with said first thermostat in controlling said damper motor means in a manner to reduce the supply of fresh air upon decrease in temperature at said second thermostat.

17. In an air conditioning system, in combination, a conditioning chamber for supplying conditioned air to a space being conditioned, means for passing a stream of fresh air to said chamber, means for passing a stream of return air from said space to said chamber, means for mixing the streams of fresh and return air passing to said chamber, damper means for controlling the supply of fresh air, damper motor means for actuating said damper means, a first thermostat responsive to the temperature of the mixture of fresh and return air for controlling said damper motor means in a manner to graduatingly cause closing of said damper means upon decrease in the temperature of said mixture, a second thermostat responsive to the temperature of one only of said streams of air for cooperating with said first thermostat in controlling said damper motor means in a manner to close said damper means upon increase in temperature at said second thermostat, means for preventing said motor means from completely closing said damper means under the control of said thermostats to thereby provide at least a minimum supply of air for ventilation while the system is in operation, and means operated as an incident to shutting down a portion of the air conditioning system for causing complete closure of said damper means irrespective of the temperatures at said thermostats.

18. In an air conditioning system, in combination, means for supplying fresh air to a space to be conditioned, damper means for controlling the supply of fresh air, reversible electric motor means for actuating said damper means, a control circuit for said reversible motor means, a pair of temperature responsive electric current controlling devices for controlling said motor means, said current controlling devices being arranged to respond to different ranges of temperature variation, one of said devices being connected into said control circuit in a manner to close said damper means upon fall in temperature and the other of said devices being connected into said control circuit in a manner to close said damper means upon rise in temperature, and a third controller for controlling said reversible motor means, said third controller being responsive to a condition within the system and being connected into said control circuit in a manner to place said pair of temperature responsive current controlling devices in full control of said reversible motor means when said condition is at a desired value, while taking full control of said motor means away from said pair of current controlling devices when said condition varies to an undesired value.

19. In an air conditioning system, in combination, a conditioning chamber for supplying conditioned air to a space being conditioned, means for passing a stream of fresh air to said chamber, means for passing a stream of return air from said space to said chamber, means for mixing the streams of fresh and return air passing to said chamber, damper means for controlling the supply of fresh air, reversible electric motor means for actuating said damper means, said reversible motor means having a control circuit, a first thermostatic electric current controlling means responsive to the temperature of the mixture of fresh and return air, said first thermostatic electric current controlling means being connected into said control circuit for causing positioning of said damper means in accordance with variations in the temperature of said mixture, a second temperature responsive electric current controlling means connected into said control circuit, said second temperature responsive electric current controlling means being responsive to the temperature of one only of said streams of air and being arranged to cause movement of said damper means towards closed position upon rise in temperature.

LEO B. MILLER.
JOHN E. HAINES.